United States Patent [19]

Haug et al.

[11] Patent Number: 5,813,106
[45] Date of Patent: Sep. 29, 1998

[54] METHOD AND APPARATUS FOR MANUFACTURING AND LAYING OUT AN UMBILICAL

[75] Inventors: Svein Haug, Rasta; Gunnar Monrad Jacobsen, Vestskogen; Knut von Trepka, Oslo, all of Norway

[73] Assignee: Kvaerner Energy A/S, Oslo, Norway

[21] Appl. No.: 290,760

[22] PCT Filed: Feb. 19, 1993

[86] PCT No.: PCT/NO93/00027

§ 371 Date: Aug. 17, 1994

§ 102(e) Date: Aug. 17, 1994

[87] PCT Pub. No.: WO93/17176

PCT Pub. Date: Sep. 2, 1993

[30] Foreign Application Priority Data

Feb. 21, 1992 [NO] Norway ................................ 920689

[51] Int. Cl.⁶ .................................................. B21D 39/00
[52] U.S. Cl. ................................................................ 29/429
[58] Field of Search .............................. 29/429, 779, 780, 29/781, 782

[56] References Cited

U.S. PATENT DOCUMENTS

| 327,478 | 9/1885 | Spalding | 29/429 |
|---|---|---|---|
| 1,799,673 | 4/1931 | Burke et al. | |
| 2,532,504 | 12/1950 | Lapsley | 29/429 |
| 3,132,416 | 5/1964 | Hait | 29/429 |
| 3,349,479 | 10/1967 | Sewell | 29/429 X |
| 3,456,449 | 7/1969 | Heil | 29/429 X |
| 3,564,701 | 2/1971 | Nash et al. | 29/429 |
| 5,101,552 | 4/1992 | Mills | 29/779 X |

FOREIGN PATENT DOCUMENTS

| 2169686 | 9/1973 | France . |
|---|---|---|
| 31 49 783 | 9/1982 | Germany . |
| 2 023 683 | 1/1980 | United Kingdom . |

*Primary Examiner*—Joseph M. Gorski
*Attorney, Agent, or Firm*—Young & Thompson

[57] ABSTRACT

A method and machine for manufacturing and laying a plurality of elongate elements into an umbilical is shown. The umbilical comprises a core element a plurality of conduits and/or cables suited outside the core element, filler material around and between the conduits/cables and a protective sheath surrounding the conduits and filler material. The finished cable cord is characterized in that the filler material is in the form of inner, elongate channel elements having outwardly opening channels, adapted for receipt of the conduits/cables, and outer, elongate channel elements having inwardly opening channels adapted for receipt and final enclosure of the conduits/cables.

2 Claims, 4 Drawing Sheets

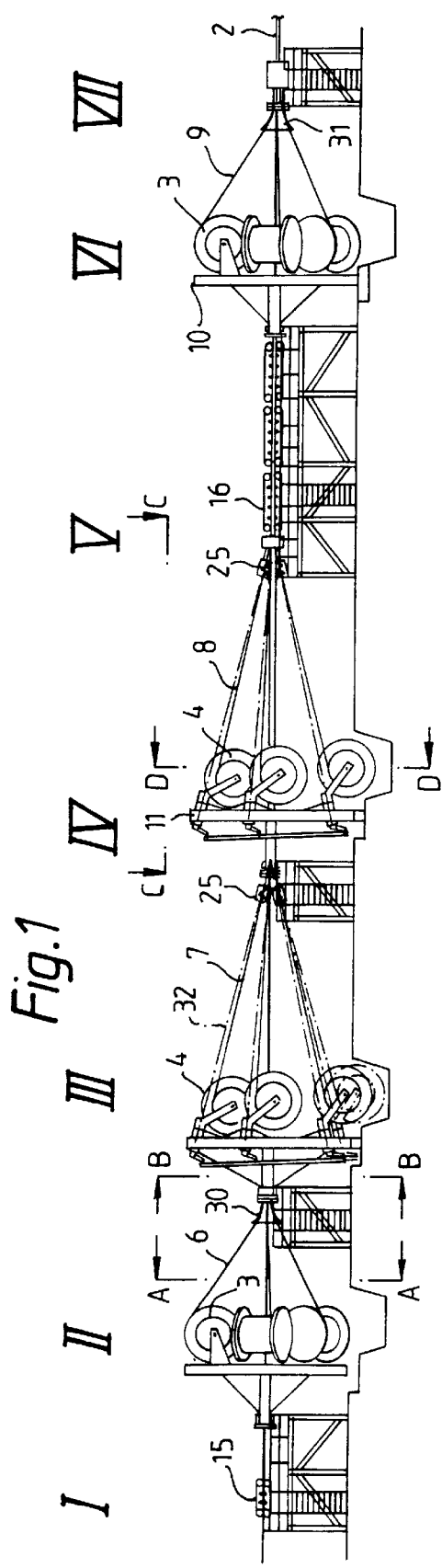
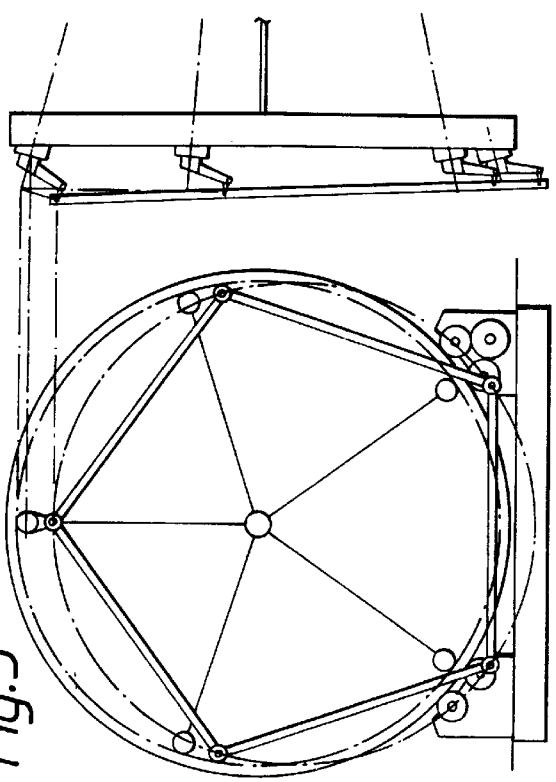
Fig.3
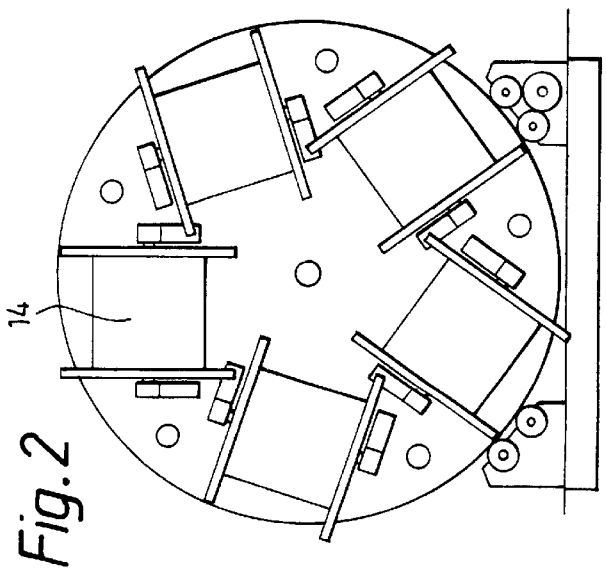
Fig.2

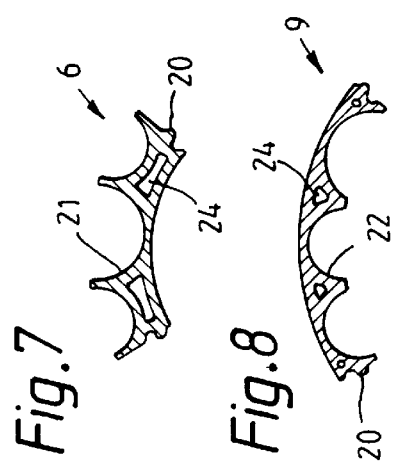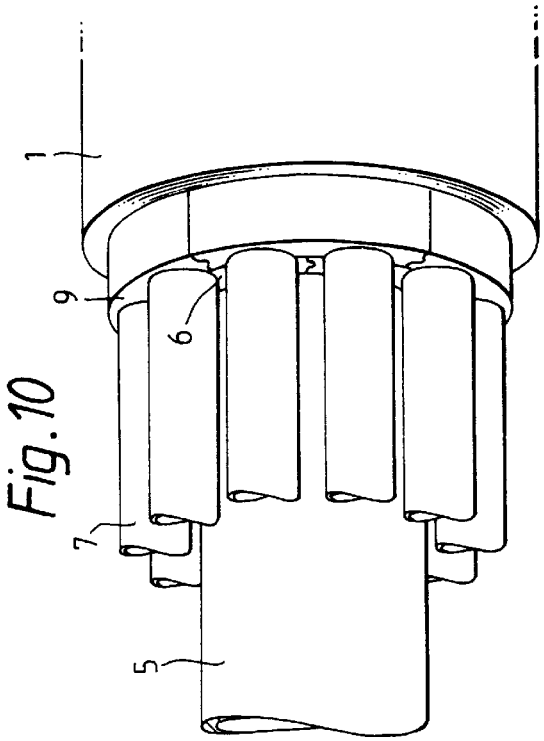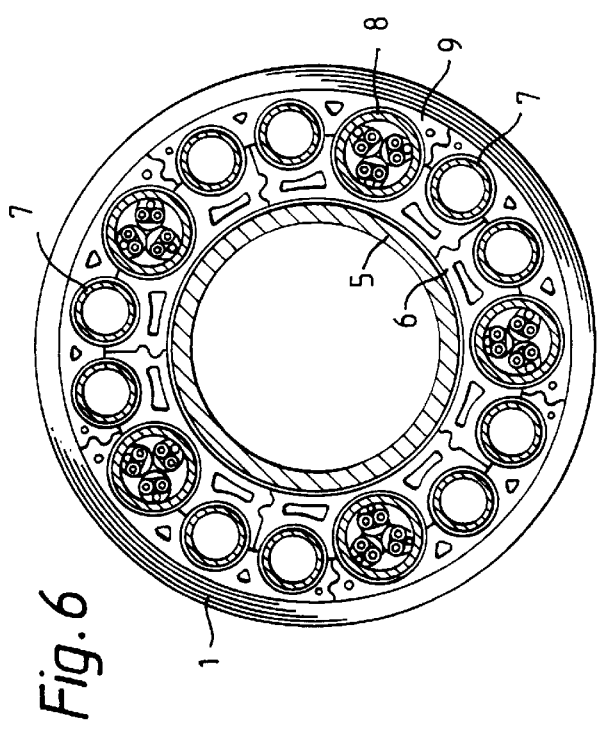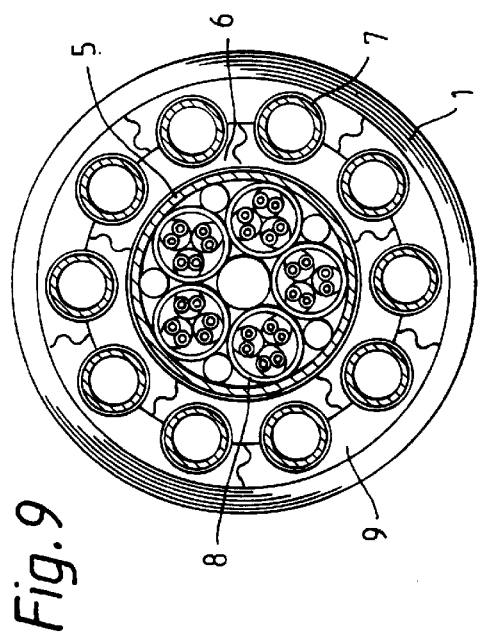

METHOD AND APPARATUS FOR MANUFACTURING AND LAYING OUT AN UMBILICAL

FIELD OF THE INVENTION

The present Invention relates to a method of manufacturing and laying a plurality of elongate elements into a cable cord, or umbilical, comprising a core element, a plurality of conduits and/or cables, situated outside the core element, filler material around and between the conduits/cables and optionally a protective sheath surrounding the conduits and filler material, which core element Is advanced along a feed line and the conduits and/or cables are fed onto the outside of the core element and laid in a helix.

The invention also relates to a machine for manufacturing of such an umbilical, which machine comprises a pulling means specifically for the core element and reels of coiled conduits and/or cables, which reels are spaced apart around the core element, and are rotatable about the core element for helical laying thereon, and pulling means acting on the conduits and/or cables.

BACKGROUND OF THE INVENTION

From British patent application GB-2038988 there is known a method and means for producing a multi-pipe conduit from a plurality of pipes and a central core as said pipes and central core are drawn in their longitudinal direction. The pipes are secured at the contact end in a non-twisted relationship around the central core.

NO patent application 873074 shows a method and an apparatus for producing helically wound pipe bundles. A group of pipes is wound together to form a continuous combination conduit from the individual supply pipes, conduits and cables that are intended to be laid in one operation in bundled form from a lay vessel at sea.

Further examples of the prior art are shown in GB-1141014, GB-1210206 and GB-1423059. An example of a previously proposed pipe bundle cable Is shown in the applicant's own Norwegian patent no. 155826.

SUMMARY OF THE INVENTION

The present umbilical is a further development of the concept shown in Norwegian patent 155826. The umbilical is a composite structure capable of transporting hydraulic fluids, chemicals, electrical and optical signals and electrical power. The conduit for chemical transport is usually placed in the center, while those for electrical signals and power and the hydraulic pipes are placed peripherally around the central element or core element. The peripherally situated elements are wound into a helix around the central pipe. Each element is free to move longitudinally in relation to the other elements. The cable cord is wrapped with a band, and the outer sheath is a thermoplastic layer extruded onto the cable cord.

The types of materials used are evaluated and selected on the basis of information about the medium to be transported, the expected lifetime and other operational criteria.

The core element may be a metal tube for conducting a liquid or may be an electrical cable for transmission of power or signals. As a metal tube it may be used, e.g, for injection of methanol into a drilling well. The materials in the metal tubes may be selected on the basis of high strength and good corrosion resistance. Examples of such materials are Super Duplex (UNS S 32750)/Duplex (UNS S 31803). Another possible material is titanium, grade 9.

The outer sheath may consist of polyethylene or polyurethane that is extruded onto the cable in a final step. Although not restrictive for the scope of the invention, a typical exterior diameter for the umbilical or cable cord would be from 50 mm to 200 mm.

It should also be noted that the umbilical enables the attainment of a small radius of curvature, meaning that it can be coiled up onto a maneuverable drum. Some plastic deformation of the steel tubes will occur, however. Still, coiling and uncoiling of the umbilical may be undertaken a considerable number of times.

As mentioned above, the new umbilical may be coiled up on a drum or carousel of a relatively small diameter. This is made possible by virtue of the fact that the conduits/cables are spiralled around the core element and are capable of bending almost freely about their own neutral axis, while not being subjected to tension or pressure as a result of bending around the neutral axis of the cable cord. Because the elements are freely movable longitudinally, it is sufficient to have a twist lay length of about 10 meters per revolution (depending on the cable dimension). The axial forces to which the cable is subjected are absorbed by the metal tubes. The long twist lay length results in very slight torsional forces in the cable when stretched, rendering it unnecessary to introduce additional elements in order to stabilize the cable in torsion.

According to the present invention, a method of the type described in the above introduction is provided, which method is characterized in that some of the filler material, in the form of inner, elongate channel elements, is first fed in helical form onto the outside of the core element, whereafter the conduits and/or cables are introduced flush with the channels in the channel elements, and that the remaining filler material, in the form of outer channel elements, is then fed in helical form onto the outside of the conduits and/or cables such that the channels in the channel elements are flush with the conduits/cables, as all of said elongate elements are laid and held together as a collective bundle and form said umbilical.

Advantageously the elongate channel elements will be brought together as they are being laid, and are held together with the aid of self-locking means on the longitudinal edges of the channel elements.

Advantageously a band/tape may be wrapped helically around the elongate elements to further ensure that the elements are held together after the laying.

The protective sheath may be applied as a separate, subsequent operation, alternatively as a final production step in continuous operation after the laying.

In accordance with the present invention, there is also provided an umbilical constructed as described in the introduction above, which is characterized in that the filler material is in the form of inner, elongate channel elements having outwardly opening channels adapted for receipt of the conduits/cables, and outer, elongate channel elements having inwardly opening channels adapted for receipt and final enclosure of the conduits/cables.

Advantageously the elongate channel elements are provided along the lateral edges thereof with self-locking fastening means which hold adjacent channel elements together around the core element.

As an alternative, the actual core element may itself be a separate umbilical on a smaller scale.

According to the invention there is also provided a machine of the type mentioned in the introduction, which is characterized in that the machine comprises at least one other set of reels with coiled filler material in the form of longitudinal channel elements, which reels are correspondingly spaced apart around the core element, and are rotatable about said core element for helical laying of the channel elements on the core element.

Each reel may advantageously be secured as a cantilever to a turntable for unobstructed coiling of the elongate elements.

The machine may have a plurality of turntables provided with reels, where the turntables are spaced apart in the feed direction of the cable.

Conveniently at least one set of reels on a turntable, in addition to being rotatable about its own longitudinal axis, is rigidly fixed to the turntable and undergoes one revolution about its transverse axis with one revolution of the turntable. Conveniently, at least one set of reels on a turntable, in addition to being rotatable about its own longitudinal axis, may be pivotably attached to the turntable in such manner that the longitudinal axis of the reels remains horizontal as the turntable revolves.

The machine may to advantage comprise alignment apparatuses for straightening out the coiled conduits/cables before they are laid into the channels of the inner channel element.

At the outlet from the machine a band winding apparatus may advantageously be placed.

An extruder may be placed at the outlet from the machine to continuously apply a protective sheath around the cable cord.

BRIEF DESCRIPTION OF THE INVENTION

In the following a preferred embodiment of the invention will be described with reference to the appended drawings, where:

FIG. 1 is a schematic view of a machine for manufactuing of the umbilical according to the invention, FIG. 2 is an elevational view of a reel station seen from a section A—A in FIG. 1, FIG. 3 is an elevational view from the back of a reel station seen from section B—B in FIG. 1, FIG. 4 is a view of a reel station seen from section C—C in FIG. 1, FIG. 5 is a view from the front of a reel station seen from section D—D in FIG. 1, FIG. 6 is a schematic transverse sectional view of an umbilical showing its construction, FIG. 7 is a section of an inner, longitudinal channel element, FIG. 8 is a section of an outer longitudinal channel element, FIG. 9 is a cross section through an alternative umbilical having a cable as the core element, FIG. 10 is a view of the umbilical according to FIG. 9, in perspective transverse section, FIG. 11 is a view of an alternative embodiment of the umbilical, and FIG. 12 is a simplified view of an apparatus and a method for laying short cable cords.

DESCRIPTION OF THE PREFERRED EMBODIMENT

We refer first to FIGS. 6–10 showing the construction of a cable cord or "umbilical" to be produced with the machine shown in FIG. 1. A steel tube forms the central core element 5. This is designed to transport chemicals such as methanol, for example, for injection into a well. On the outside of core element 5 lie a plurality of inner, elongate channel elements 6, illustrated in more detail in FIG. 7. In the embodiment shown there are placed five such channel elements 6, completely enclosing core element 5. This number may, of course, be altered according to the requirements of the individual umbilical. Channel elements 6 have self-locking fastening means 20 along the lateral edges thereof to hold adjacent channel elements 6 together around core element 5. Channel elements 6 also have outwardly opening channels 21 adapted to receive conduits 7 and cables 8. The number of conduits and cables may vary according to need, and in certain applications either the conduits or the cables may be omitted. Outer, elongate channel elements 9 lie on the outside of the inner channel elements 6 and have corresponding inwardly opening channels 22 adapted for receipt and final enclosure of conduits 7 and cables 8. The outer channel elements 9 are also provided along the lateral edges thereof with self-locking fastening means 20 which hold adjacent channel elements 9 together around the inner channel members 6 or core element 5. The outer channel element 9 is shown in more detail in FIG. 8.

Both the inner and outer channel elements 6, 9 may have voids 24 designed to reduce weight and use of material. In addition, precise profile dimensions require uniform material thicknesses, necessitating the voids 24. It should also be noted that there is a clearance provided between the conduits/cables and the joined channel elements 6, 9, to enable conduits 7 and cables 8 to move freely within the channel elements.

FIG. 9 shows an alternative embodiment of the umbilical where the central core is made up of an additional cable cord. As shown, the electrical cables run within the central core element and the steel tubes for hydraulic fluid are situated externally to the core element and are freely movable within channel elements 6, 9.

FIG. 10 shows the umbilical according to FIG. 9, in perspective transverse section.

Figure 4:
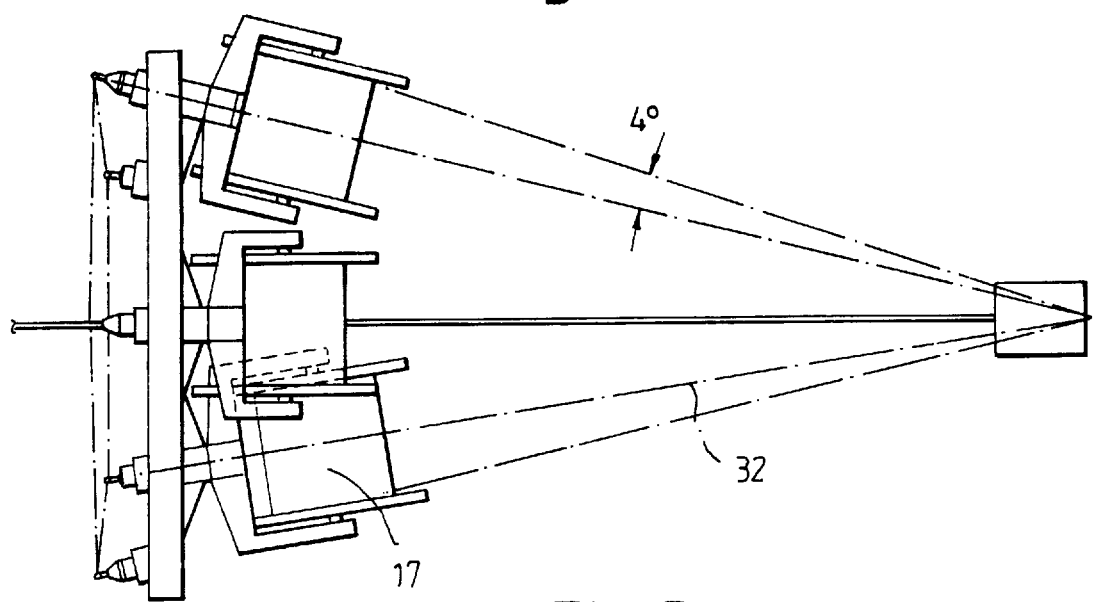

Channel elements 6, 9 may consist of extruded PVC profiles that are delivered in long lengths on reels. The outer, protective sheath 1 may consist of polyethylene (PE) that has been extruded onto the cable cord. Polyethylene will be chosen due to its excellent mechanical properties and bending capabilities. Alternatively, sheath 1 may be made of polyurethane, or optionally of any suitable material whatsoever.

We refer now to FIG. 1 to describe the construction of the machine. At the input end of the machine (to the left in FIG. 1) core element 5 is drawn into the machine at station I with the aid of a pulling means 15. This pulling means 15 may be a so-called caterpillar pull, or alternatively a linear winch. As mentioned before, core element 5 may in certain applications be a steel tube that is uncoiled from a reel. Core element 5 advantageously passes through an alignment apparatus (not shown) before entering the machine. Core element 5 follows a rectilinear movement into the machine, undergoing no rotation about its own axis. Core element 5 is fed through the machine at the speed permitted by the machine, as well as the speed permitted by a reception mechanism (not shown). The reception mechanism may consist of a reclining carousel. Typical maximum speed would be 30 m/min.

Station II in FIG. 1 shows a turntable with reels 3 attached thereto. FIG. 2 shows station II seen from the front. The illustrated embodiment has five reels 3, but any suitable number is possible. Each reel is rotatable about its longitudinal axis 14. If desired, each reel 3 may be provided with braking capability. Reels 3 carry coiled up inner, elongate channel elements 6, e.g., extruded PVC elements. Each reel 3 is mounted on two cantilevered arms on the large turntable 10. The coiled channel elements 6 are fed in toward core element 5 and pass into a funnel apparatus 30 as turntable 10 revolves, and are laid helically onto the outside of core element 5.

A station III also has a plurality of reels 4, but these carry coiled up conduits 7, or cables 8. Each reel 4 is mounted on and pivotably attached to another large turntable 11, in such manner that the longitudinal axis of the reels (uncoiling) remains horizontal while the large turntable 11 rotates. As is apparent from the figure, the steel conduits 7, optionally cables 8, pass through alignment apparatuses 25 before being laid helically in channels 21 of the inner channel elements 6 during rotation of turntable 11. The conduits 7 or cables 8 are not, however, twisted about their own axes.

Station IV, like station III, has reels 4 containing coiled up cables 8, optionally conduits 7. Whether conduits 7 emerge from station II or from station IV, or some conduits 7 and some cables 8 come from the same station, is of no import per se. In most respects station IV functions in like manner to station III. Before cables 8, optionally conduits 7, are laid onto the outside of the umbilical, they also here pass through alignment apparatus 25.

Station V comprises a plurality of pulling means 16 which frictionally engage conduits 7 and cables 8 which, in turn, frictionally take hold of the inner channel elements 6 and draw these off their respective reels 3, 4 in stations II, III and IV. It should be noted, in addition, that core element 5 is urged through the machine with the aid of the pulling means in station I.

Station VI also has a turntable 10 and reels 3, but with coiled up outer channel members 9, e.g., in the form of extruded PVC elements. Channel elements 9 are fed into a funnel apparatus 31 are laid helically onto the outside of core element 5, as all the elongate elements are laid into the finished umbilical. Station VI otherwise functions in a manner quite similar to that of station II.

As mentioned above, the elongate elements are laid, or twisted together, in the funnel apparatus 31 in station VII and assume their final form. Station VII also comprises a band winding apparatus which wraps a tape or band around the laid cable cord to help hold it together.

An optional final station (not shown) may apply the outer coating, e.g. polyethylene, in a continuous operation, or this may be done subsequently as a separate operation.

Conduits 7 and cables 8 pass through the mentioned alignment apparatuses 25 for removal of inherent "curvature" resulting from their being coiled up.

In FIG. 1 are shown four reel stations with five reels for each station. The number of stations and number of reels may be varied according to the specific cable to be produced.

Figure 5:
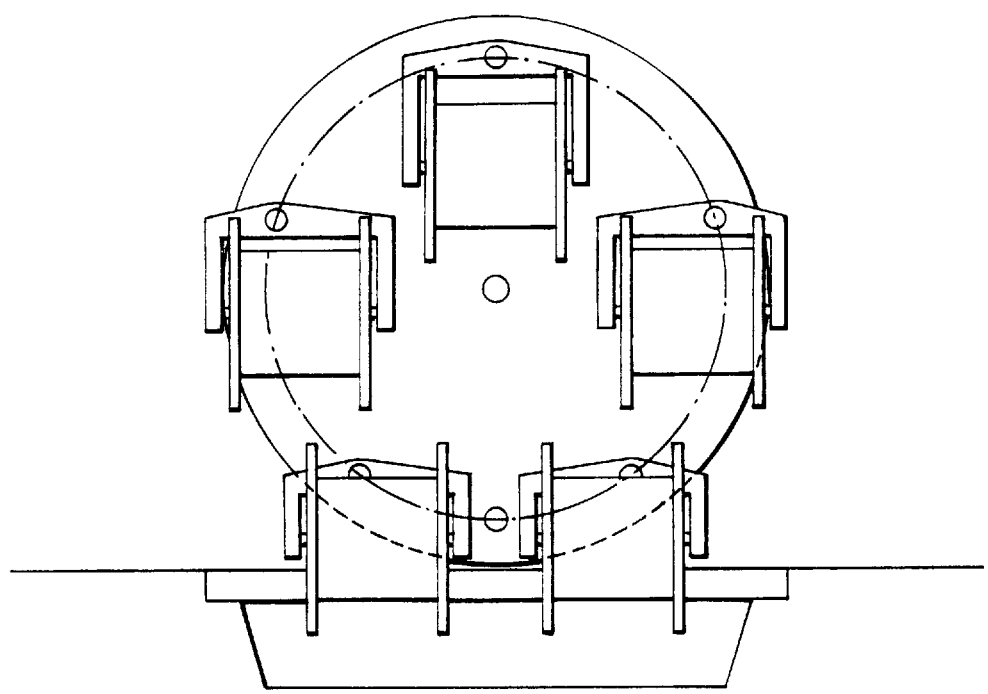

FIG. 3 is a rear view of reel station III, showing a mechanism that helps hold reels 4 in a fixed position as turntable 11 revolves. FIG. 4 is a view from the top of reel station III or IV. The longitudinal axis 17 of reels 4 is held substantially horizontal by means of the mechanism shown in FIG. 3 and the effect of gravity on reels 4. Reels 4 also have braking capability, permitting application of the requisite tension to conduits 7 and cables 8. FIG. 5 shows reel station IV viewed from the front and illustrates the horizontal position for the longitudinal axes of drums 4 during their movement around core element 5.

The velocity of rotation for the machine may be about 3 revolutions/min. Rotation of the turntables is effected by engine driven supporting rollers with individual drive, that are coupled together in a central electrical control unit. All turntables rotate synchronously during the cable laying, but may be driven individually for loading/changing of reels, etc. As mentioned above, the reels for the channel elements are fixedly mounted to the turntables. The channel elements will thereby be twisted so as to follow the spiralling of the cable.

The reels for conduits 7 or cables 8 are suspended in fork-like holders. The holders are formed asymmetrically so that the reel axis, with the aid of gravity, remains horizontal below the shaft of the holder.

The holder shaft is mounted in the turntable and is oriented toward a point on the machine's axis of rotation by means of supporting journals to the carousel preceding it. The reels will therefore always be directed toward this point.

The freely suspended part of the tubing will maintain a constant length during rotation of the carousel. The distance between the reel and the funnel apparatus allows the tube to be pulled out from the reel with very little angular deflection.

Another advantage of the fork design for the reel suspension is that the reels may be loaded from the front. Thus it is possible to use a carriage to move the reels into the fork instead of using a crane, which is the conventional practice. Installation by use of a carriage is a simpler and safer method.

To stabilize the holders, i.e., to avoid oscillations and outward swing due to centrifugal force, the rear end of the holder shaft is equipped with arms that constantly point downward. The arms are reciprocally connected with ball joints and stays.

When hydraulic tubes are wound up on reels to be suspended in the cable twister, the tubes will be subjected to plastic deformation. When the tubes are to be gathered together at the laying or twisting point it is important that they are straight. Only then is it possible for them to be laid down in the channel elements. On the path from the reel to the laying or twisting point there is placed an alignment apparatus, as mentioned above. The suspension means for the alignment apparatus rotates to keep the apparatus at all times in the correct position relative to the tube.

Figure 11:
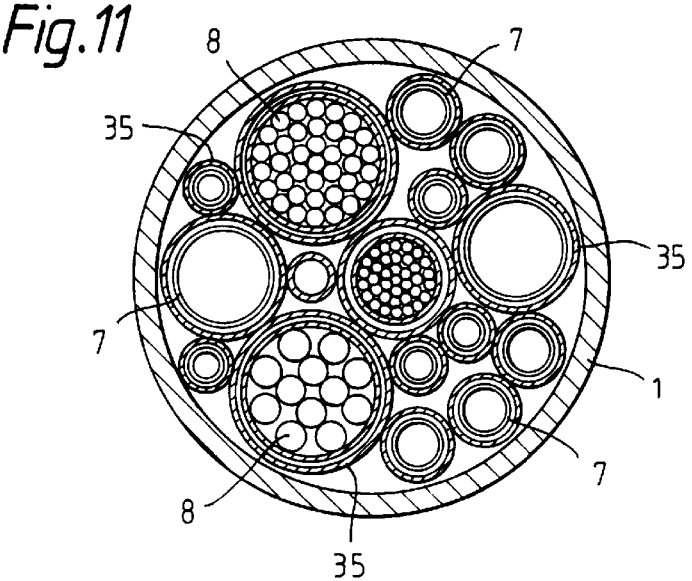

FIG. 11 shows an alternative embodiment of the umbilical according to the invention. Instead of using the previously mentioned channel elements 6, 9, a PVC tube of the "electrical tube" type is used. These "electrical tubes" may have different dimensions in order to accommodate cables and tubes of various sizes. This type of umbilical is specifically designed for production of short cable lengths, e.g., up to 500 m, where the cord has the same properties with regard to strength and bending as previously described. The short length makes it possible to lay the cable manually without using an expensive laying, or cable twisting, machine. The channel elements may therefore be replaced by the electrical tubes or plastic tubes that are sleeved manually over the individual conduits and single cables.

Figure 12:
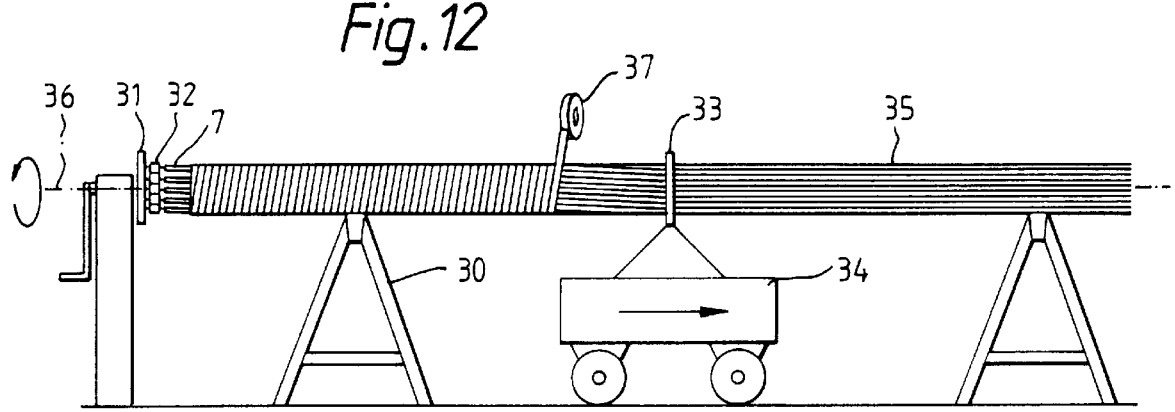

FIG. 12 is a simplified view of an apparatus and a method for laying this type of short cable cord. The separate steel conduits 7 are welded together along the full length of the cable and tested according to qualitative criteria. These conduits 7, together with any cables 8 cut to the same length, form the individual elements of the umbilical 2. All the individual elements are laid upon trestles 30. The individual elements are attached at one end to a rotatable disc or turntable 31, with the same individual placement as in the umbilical cross section. Each individual element is attached to a swivel 32 on disc 31 permitting rotation about the elements' longitudinal axis. Before the elements are attached to turntable 31 they are threaded through a matrix 33, i.e., a disc having the same configuration as the cable cross section. This matrix 33 is attached to a carriage 34 which may be drawn along the cable.

Each individual element is drawn up and the plastic tubes 35 are sleeved onto the free end. The plastic tubes are delivered in short lengths and must be spliced together after being sleeved onto the elements. The splicing can be done with a splicing apparatus based on gluing or welding.

After the elements are laid in the plastic tubing, they are stretched out at the free end so that they lie taut across the trestles.

The cable is laid, or twisted, together by advancing carriage 34 along with the cable at the same time as the turntable is rotated slowly about the cable axis 36. Immediately behind the matrix the cable is wrapped with tape 37 so that the cable cross section is securely locked into place.

If necessary the cable cross section may be stabilized with the aid of filler elements that are laid in like the other elements, and/or by injecting hardening foam into the cross section. After the laying, the outer sheath is extruded onto the cable, as described previously.

We claim:

1. A method of manufacturing an umbilical, comprising the steps of:

providing a core element;

providing first arcuate elongate elements each having a plurality of channels in a surface thereof;

providing second arcuate elongate elements each having a plurality of channels in a surface thereof;

providing elongate members;

providing a protective material;

feeding said core element along a longitudinal path;

wrapping a plurality of said first arcuate elongate elements helically around said core element as said core element travels along said longitudinal path, whereby said plurality of elongate elements form a first tubular structure surrounding said core element, with said first tubular structure being substantially coaxial with said core element, and having the channels extending helically around and facing outwardly away from said core element;

inserting one of said elongate members within each of said channels of said first tubular structure as said core element travels along said longitudinal path;

wrapping a plurality of said second arcuate elongate elements helically around said elongate members inserted within said channels as said core element travels along said longitudinal path, whereby said plurality of second elongate elements form a second tubular structure surrounding said elongate members and said first tubular structure, with the channels of the second tubular structure extending helically around and facing inwardly toward said core element, such that each of the channels of said second tubular structure cover and partially surround one of said elongate members inserted within the channels of said first tubular structure; and wrapping said protective material around said second tubular structure.

2. The method of claim 1, wherein the step of providing the first arcuate elongate elements includes the step of providing each first arcuate elongate element with self-locking structure along each longitudinal edge thereof and, the step of wrapping the plurality of first arcuate elongate elements helically around said core elements includes interconnecting the self-locking structure on each longitudinal edge with the self-locking structure on the longitudinal edge of another of said first arcuate elongate elements, such that the first tubular structure is formed.

* * * * *